US 6,555,027 B2

(12) United States Patent
Wang et al.

(10) Patent No.: US 6,555,027 B2
(45) Date of Patent: *Apr. 29, 2003

(54) SECOND-ORDER NONLINEAR OPTICAL CHROMOPHORES CONTAINING DIOXINE AND/OR BITHIOPHENE AS CONJUGATE BRIDGE AND DEVICES INCORPORATING THE SAME

(75) Inventors: Chuanguang Wang, Los Angeles, CA (US); Cheng Zhang, Los Angeles, CA (US); Harold R. Fetterman, Pacific Palisades, CA (US); William Steier, San Marino, CA (US); Joseph Michael, Los Angeles, CA (US)

(73) Assignee: Pacific Wave Industries, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/898,625

(22) Filed: Jul. 3, 2001

(65) Prior Publication Data

US 2002/0027220 A1 Mar. 7, 2002

Related U.S. Application Data

(63) Continuation-in-part of application No. 09/488,422, filed on Jan. 20, 2000, now Pat. No. 6,361,717, which is a continuation-in-part of application No. 09/122,806, filed on Jul. 27, 1998, now Pat. No. 6,067,186, which is a continuation-in-part of application No. 09/546,930, filed on Apr. 11, 2000, and a continuation-in-part of application No. 09/551,685, filed on Apr. 18, 2000, now Pat. No. 6,348,992.

(51) Int. Cl.$^7$ .............................. F21V 9/00; G02F 1/35
(52) U.S. Cl. ...................................... 252/582; 359/328
(58) Field of Search .......................... 252/582; 359/326, 359/328

(56) References Cited

U.S. PATENT DOCUMENTS 5,079,321 A   1/1992  Sperling et al.
5,156,774 A  10/1992  Leising et al.

(List continued on next page.)

OTHER PUBLICATIONS

Z. Sekkat et al., "Room–Temperature Photoinduced Poling and Thermal Poling of a Rigid Main–Chain Polymer with Polar Azo Dyes in the Side Chain," *Chem. Mater.* 1995, 7, 142–147.

N. Nemoto et al., "Novel Types of Polyesters Containing Second–Order Nonlinear Optically Active Chromophores with High Density," *Macromolecules* 1996, 29, 2365–2371.

(List continued on next page.)

*Primary Examiner*—Philip Tucker
(74) *Attorney, Agent, or Firm*—Henricks, Slavin & Holmes LLP

(57) ABSTRACT

Second-order nonlinear optical (NLO) polyene-based chromophores sterically stabilized with a dioxine ring and NLO chromophores containing bithiophene derivatives, and devices incorporating the same, are disclosed. An exemplary preferred chromophore includes an aminophenyl electron donor group and a dioxine-containing bridge structure. Another exemplary preferred chromophore includes a ring-locked bridge structure with a dioxine unit and a bithiophene unit. Another exemplary preferred chromophore includes a bridge structure with a bithiophene unit and an isophorone-derived cyclohexene unit.

7 Claims, 9 Drawing Sheets

| Chromophore | $\lambda_{max}$ (nm) | $\Delta\lambda_{max}$ (nm) |
|---|---|---|
| CWC-1 | 608 (CHCl$_3$) | 52 |
| | 556 (Dioxane) | |
| CWC-2 | 732 (CHCl$_3$) | 57 |
| | 676 (Dioxane) | |
| CWC-3 | 739 (CHCl$_3$) | 56 |
| | 682 (Dioxane) | |
| CWC-4 | 610 (CHCl$_3$) | 28 |
| | 582 (Dioxane) | |

U.S. PATENT DOCUMENTS

| | | | |
|---|---|---|---|
| 5,196,147 | A | 3/1993 | Taketani et al. |
| 5,290,630 | A | 3/1994 | Devonald et al. |
| 5,432,286 | A | 7/1995 | Cabrera et al. |
| 5,514,799 | A | 5/1996 | Varanasi et al. |
| 5,535,048 | A | 7/1996 | Mignani et al. |
| 5,549,853 | A | 8/1996 | Beckmann et al. |
| 5,663,308 | A | 9/1997 | Gibbons et al. |
| 5,670,603 | A | 9/1997 | Wu et al. |
| 5,676,884 | A | 10/1997 | Tiers et al. |
| 5,679,763 | A | 10/1997 | Jen et al. |
| 5,688,906 | A | 11/1997 | Jen et al. |
| 5,697,744 | A | 12/1997 | Medal |
| 5,698,134 | A | 12/1997 | Jubb et al. |
| 5,714,304 | A | 2/1998 | Gibbons et al. |
| 5,718,845 | A | 2/1998 | Drost et al. |
| 5,738,806 | A | 4/1998 | Beckmann et al. |
| 5,776,374 | A | 7/1998 | Newsham et al. |
| 5,783,306 | A | 7/1998 | Therien et al. |
| 5,804,101 | A | 9/1998 | Marder et al. |
| 5,846,638 | A | 12/1998 | Meissner |
| 5,854,866 | A | 12/1998 | Leonard |
| 5,882,785 | A | 3/1999 | Hollins et al. |
| 5,883,259 | A | 3/1999 | Kim et al. |
| 5,887,116 | A | 3/1999 | Grote |
| 5,889,131 | A | 3/1999 | Kim et al. |
| 5,892,859 | A | 4/1999 | Grote |
| 6,361,717 | B1 * | 3/2002 | Dalton et al. ............... 252/582 |

OTHER PUBLICATIONS

Y. Zhang et al., "A new hyperbranched polymer with polar chromophores for nonlinear optics," *Polymer* (1997), 38(12), 2893–2897.

S. Yokoyama et al., "Second harmonic generation of dipolar dendrons in the assembled thin films," *Thin Solid Films* 331 (1998) 248–253.

C. Zhang et al., "Chromophore Incorporating Fluorinated Aromatic Polyester for Electro–optic Applications," *Polymer Preprints* 40(2) Aug. 1999.

L. R. Dalton et al., "From molecules to opto–chips: organic electro–optic materials," *J. Mater. Chem.*, 1999, 9, 1905–1920.

T. M. Londegran et al., "Dendrimer Functionalized NLO Chromophores," *Polymer Preprints* 2000, 41(1), 783–784.

L. R. Dalton, "Polymeric electro–optic materials: optimization of electro–optic activity, minimization of optical loss, and fine–tuning of device performance," *Opt. Eng.* 39(3) 589–595 (Mar. 2000).

S. Yokoyama et al., "Intermolecular Coupling Enhancement of the Molecular Hyperpolarizability in Multichromophoric Dipolar Dendrons," *J. Am. Chem. Soc.* 2000, 122(13), 3174–3181 (Published on Web Mar. 11, 2000).

H. Ma et al., "A Novel Class of High–Performance Perfluorocyclobutane–Containing Polymers for Second–Order Nonlinear Optics," *Chem. Mater.* 2000, 12, 1187–1189 (Published on Web Apr. 7, 2000).

H. Ma et al., "Novel Perfluorocyclobutate–Containing Thermoset Polymers and Dendrimers for Electro–Optic Devices," *Polym. Mater. Sci. Eng.* (Aug. 20–24, 2000), 83 165–166.

D. G. Girton, et al., "20 GHz electro–optic polymer Mach–Zehnder modulator", *Applied Physics Letters*, vol. 58, No. 16, pp. 1730–1732 (1991).

D. M. Burland, et al., "Second–Order Nonlinearity in Poled–Polymer Systems", *Chemical Reviews*, vol. 94, pp. 31–75 (1994).

S. Kalluri, "Improved poling and thermal stability of sol–gel nonlinear optical polymers", *Applied Physics Letters*, vol. 65, No. 21, pp. 2651–2653 (1994).

I. Cabrere, et al., "A New Class of Planar–Locked Polyene Dyes for Nonlinear Optics", *Advanced Materials*, vol. 6, pp. 43–45 (1994).

W. Wang, "40–GHz Polymer Electrooptic Phase Modulators", *IEEE Photonics Technology Letters*, vol. 7, No. 6, pp. 638–640 (1995).

L. R. Dalton, et al., "Sythesis and Processing of Improved Organic Second–Order Nonlinear Optical Materials for Applications in Photonics", *Chemistry of Materials*, vol. 7, pp. 1060–1081 (1995).

S. Kalluri, "Monolithic Integration of Waveguide Polymer Electrooptic Modulators on VLSI Circuitry", *IEEE Photonics Technology Letters*, vol. 8, No. 5, pp. 644–646 (1996).

Y. Shi, et al., "Fabrication and Characterization of High–Speed Polyurethane–Disperse Red 19 Integrated Electrooptic Modulators for Analog System Applications", *IEEE Journal of Selected Topics in Quantum Electronics*, vol. 2, No. 2, pp. 289–299 (1996).

C. Shu, et al., "Synthesis of second–order nonlinear optical chromophores with enhanced thermal stability: a conformation–locked trans–polyene approach", *Chemical Communication*, pp. 2279–2280 (1996).

A. Chen, "Optimized Oxygen Plasma Etching of Polyurethane–Based Electro–optic Polymer for Low Loss Optical Waveguide Fabrication", *Journal of Electrochemical Society*, vol. 143, No. 11, pp. 3648–3651 (1996).

D. X. Zhu, "Noncollinear four–wave mixing in a broad area semiconductor optical amplifier", *Applied Physics Letters*, vol. 70, No. 16, pp. 2082–2084 (1997).

D. Chen, "Demonstration of 110 GHz eletro–optic polymer modulators", *Applied Physics Letters*, vol. 70, No. 25, pp. 3335–3337 (1997).

L. Dalton, "Polymeric electro–optic modulators", *Chemistry & Industry*, pp. 510–514 (1997).

S. Emmer, "Synthesis and Nonlinearity of Triene Chromophores Containing the Cyclohexen Ring Structure", *Chemistry of Materials*, vol. 9, pp. 1437–1442 (1997).

A. Harper, et al., "Translating microscopic optical nonlinearity into macroscopic optical nonlinearity: the role of chromophore–chromophore electrostatic interactions", *Journal of Optical Society of America*: B, vol. 15, No. 1, pp. 329–337 (1998).

A. Chen, et al., "Low–$V_x$ electro–optic modulator with a high–$\mu\beta$ chromophore and a constant–bias field", *Optics Letters*, vol. 23, No. 6, pp. 478–480 (1998).

C. Shu, et al., Nonlinear Optical Chromophores with Configuration–Locked Polyenes Possessing Enhanced Thermal Stability and Chemical Stability, *Chemistry of Materials*, vol. 10, pp. 3284–3286 (1998).

* cited by examiner

| Chromophore | $\lambda_{max}$ (nm) | $\Delta\lambda_{max}$ (nm) |
|---|---|---|
| CWC-1 | 608 (CHCl$_3$) | 52 |
| | 556 (Dioxane) | |
| CWC-2 | 732 (CHCl$_3$) | 57 |
| | 676 (Dioxane) | |
| CWC-3 | 739 (CHCl$_3$) | 56 |
| | 682 (Dioxane) | |
| CWC-4 | 610 (CHCl$_3$) | 28 |
| | 582 (Dioxane) | |

FIG. 1

| Loading Density of CWC-2 in APC (wt %) | E-O Coefficient (1.3 μm, pm/V) | Refractive Index (1.3 μm) |
|---|---|---|
| 20 | 44 | 1.619 |
| 25 | 54 | 1.639 |
| 28 | 56 | 1.654 |
| 30 | 68 | 1.663 |
| 35 | 61 | 1.671 |

SECOND-ORDER NONLINEAR OPTICAL CHROMOPHORES CONTAINING DIOXINE AND/OR BITHIOPHENE AS CONJUGATE BRIDGE AND DEVICES INCORPORATING THE SAME

CROSS-REFERENCE TO RELATED APPLICATIONS

This application is a continuation-in-part of U.S. patent application Ser. No. 09/488,422 entitled "Sterically Stabilized Second-Order Nonlinear Optical Chromophores and Devices Incorporating the Same" filed on Jan. 20, 2000, now U.S. Pat. No. 6,361,717, which is a continuation-in-part of U.S. patent application Ser. No. 09/122,806 entitled "Class of High Hyperpolarizability Organic Chromophores and Process for Synthesizing the Same" filed on Jul. 27, 1998, now U.S. Pat. No. 6,067,186. This application is also a continuation-in-part of U.S. patent application Ser. No. 09/546,930 entitled "Sterically Stabilized Second-Order Nonlinear Optical Chromophores With Improved Stability and Devices Incorporating the Same" filed on Apr. 11, 2000, PENDING and a continuation-in-part of U.S. patent application Ser. No. 09/551,685 entitled "Sterically Stabilized Polyene-Bridged Second-Order Nonlinear Optical Chromophores With Improved Stability and Devices Incorporating the Same" filed on Apr. 18, 2000, now U.S. Pat. No. 6,348,992. The disclosures of these applications are incorporated herein by reference in their entirety.

STATEMENT REGARDING FEDERALLY SPONSORED RESEARCH AND DEVELOPMENT

This invention was made with support from the government of the United States of America under Contracts F49620-97-C-0064, F49620-97-1-0307, F49620-97-1-0491, F49620-98-C-0059, F49620-98-C-0077, F49620-99-0040 awarded by the United States Air Force. The government of the United States of America has certain rights in this invention as provided by these contracts.

BACKGROUND OF THE INVENTION

1. Field of the Invention

The present invention relates to nonlinear optical chromophores and, more particularly, pertains to second-order nonlinear optical (NLO) polyene-based chromophores sterically stabilized with a dioxine ring and NLO chromophores containing bithiophene derivatives, and devices incorporating the same.

2. Description of the Related Art

Organic second-order nonlinear optical (NLO) materials have recently received increasing attention for applications involving signal processing and telecommunications. Macroscopic nonlinearity of a NLO material is mainly determined by its active component, NLO chromophore which is typically a quasi-linear electron push-pull conjugated molecule having an electron donor group at one end and an electron acceptor group at the other end. Chromophore intermolecular electrostatic interactions prevent the simple scaling of molecular optical nonlinearity into macroscopic optical nonlinearity. Such interactions strongly attenuate the efficient induction of acentric chromophore order (hence, electrooptic activity) by electric field poling or self-assembly methods. Chromophores with β values many times those of the well-known Disperse Red 19 dye are thus required to obtain electrooptic coefficients comparable to or higher than those of the leading commercial material crystalline lithium niobate.

The value of β for a chromophore can be increased by using a diene moiety in place of thiophene in the conventional phenylethenylenethiophene π-conjugated bridge. Moreover, this enhancement in β can be accomplished without an increase in the wavelength of the charge-transfer absorption $\lambda_{max}$. However, the resulting phenylpolyene bridge has poor thermal stability unless the polyene structure is locked by a ring structure.

Another effective way of increasing molecular nonlinearity is to extend the bridge with a bithiophene. Traditionally, the bithiophene is incorporated with introducing any side groups on the 3,4-positions of the two thiophene rings. However, the resulting chromophores generally have poor solubility.

SUMMARY OF THE INVENTION

A synthetic methodology of a dioxine-locked aminophenylpolyenal donor-bridge, according to the present invention, is described herein. This methodology broadens the scope of polyene-bridged chromophores without sacrificing thermal stability or optical transparency. This synthetic approach facilitates the development of NLO materials possessing EO coefficients as high as 95 pm/V at 1.06 μm and 68 pm/V at 1.3 μm as determined by the attenuated total reflection (ATR) technique.

A variety of different molecular structures are possible for the chromophores of the present invention. An exemplary preferred chromophore according to the present invention includes an aminophenyl electron donor group and a dioxine-containing bridge structure. In a preferred embodiment, the bridge structure also includes at least one bulky side group.

Another exemplary preferred chromophore according to the present invention includes an electron donor group, an electron acceptor group and a ring-locked bridge structure between the electron donor group and the electron acceptor group. The bridge structure comprises a dioxine unit and a bithiophene unit. In a preferred embodiment, the bithiophene structure also includes at least one bulky side group.

Another exemplary preferred chromophore according to the present invention includes an electron donor group, an electron acceptor group, and a bridge structure there between, with the bridge structure including a bithiophene unit. In a preferred embodiment, the bridge structure further includes an isophorone-derived cyclohexene unit.

The NLO materials of the present invention are suitable for a wide range of devices. Functions performed by these devices include, but are not limited to: electrical to optical signal transduction; radio wave to millimeter wave electromagnetic radiation (signal) detection; radio wave to millimeter wave signal generation (broadcasting); optical and millimeter wave beam steering; and signal processing such as analog to digital conversion, ultrafast switching of signals at nodes of optical networks, and highly precise phase control of optical and millimeter wave signals. These materials are suitable for arrays which can be used for optical controlled phased array radars and large steerable antenna systems as well as for electro-optical oscillators which can be used at high frequencies with high spectral purity. Exemplary devices and applications for the NLO materials of the present invention include, but are not limited to: optical phase modulators, Mach-Zehnder intensity modulators, polarization modulators, single side band modulators, modulator cascades, nested modulators, modulator arrays, flexible modulators, electrically controlled optical switches, electrically controlled optical couplers, electrically controlled optical attenuators, optically controlled optical switches, electrically tunable filters, electrically tunable polymer gratings, multiplexers, de-multiplexers, optical cross-connects, optical waveguides for harmonic frequency generation, optical waveguides for sum frequency generation, optical waveguides for difference frequency generation, photonic RF phase shifters, RF quadrature amplification modulators, photonic oscillators based on polymer intensity modulators, time stretching/compression based on polymer intensity modulators, optically controlled phased arrays based on polymer modulators, optical gyroscopes using polymer phase shifters, RF photonic links using polymer modulators, intensity modulators for active mode-locking, optical phase modulators for active mode-locking, optical amplifier gain stabilization based on polymer non-linear optical waveguide devices, and wavelength selectivity/stabilization using polymer non-linear optical waveguide devices.

DESCRIPTION OF THE DRAWINGS

Other objects, features and advantages of the invention will become readily apparent upon reference to the following detailed description when considered in conjunction with the accompanying drawings, in which like reference numerals designate like parts throughout the figures thereof, and wherein:

FIG. 1 illustrates the structures and absorption wavelengths of exemplary CWC chromophores containing dioxine and/or bithiophene according to the present invention;

FIG. 3 shows electro-optic coefficient @1.3 $\mu$m of poled CWC-2/APC thin films of different chromophore loading density;

DETAILED DESCRIPTION OF THE PREFERRED EMBODIMENTS

The following is a detailed description of the best presently known mode of carrying out the invention. This description is not to be taken in a limiting sense, but is made merely for the purpose of illustrating the general principles of the invention.

Referring to FIG. 1, the chemical structures and $\lambda_{max}$s of representative CWC-series chromophores are shown. These chromophores incorporate side-chain derivatized bithiophene and/or dioxin unit into the conjugate bridge of the electron push-pull structure. The long side chains on the bithiophene force the two thiophenes to take a nonplanar configuration and thus greatly reduce inter-chromophore electrostatic interaction. As a result, these chromophores are very soluble in organic solvents such as acetone, chloroform, dichloroethane and can be easily processed into optical quality guest-host polymer films. After corona poling, the films show very high electro-optic activities as measured by attenuated total reflection method (see FIGS. 3 and 4).

Figure 1A:
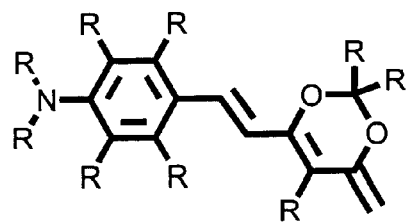
FIG. 1A illustrates an exemplary donor-bridge structure for the chromophores of the present invention.

Referring to FIG. 1A, an exemplary donor-bridge structure for the chromophores of the present invention is shown. An exemplary preferred chromophore according to the present invention includes an aminophenyl electron donor group and a dioxine-containing bridge structure. In a preferred embodiment, the bridge structure also includes at least one bulky side group. With reference to FIG. 1A, R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

Figure 1B:
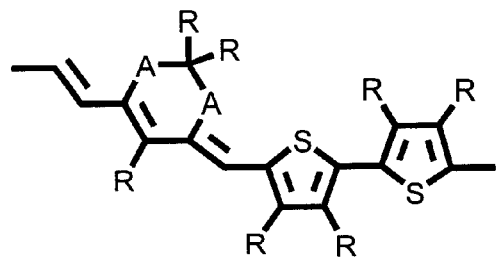
FIG. 1B illustrates an exemplary bridge structure for the chromophores of the present invention.

Referring to FIG. 1B, an exemplary bridge structure for the chromophores of the present invention is shown. An exemplary preferred chromophore according to the present invention includes a dioxine unit and a bithiophene unit. In a preferred embodiment, the bithiophene structure also includes at least one bulky side group. With reference to FIG. 1B, A is selected from $CH_2$ and O, and R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

Figure 1C:
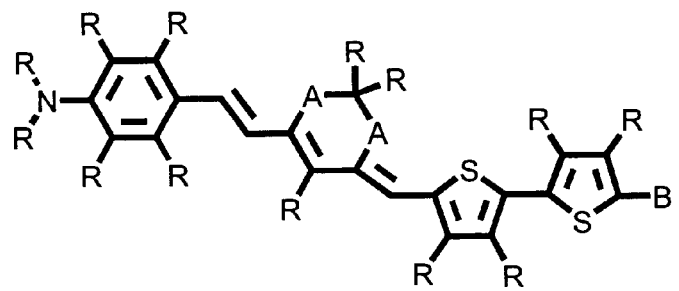
FIG. 1C illustrates an exemplary chromophore structure according to the present invention.

Referring to FIG. 1C, an exemplary chromophore structure according to the present invention is shown. For the illustrated chromophore, A is selected from $CH_2$ and O, B is an electron acceptor, R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

Figure 1D:
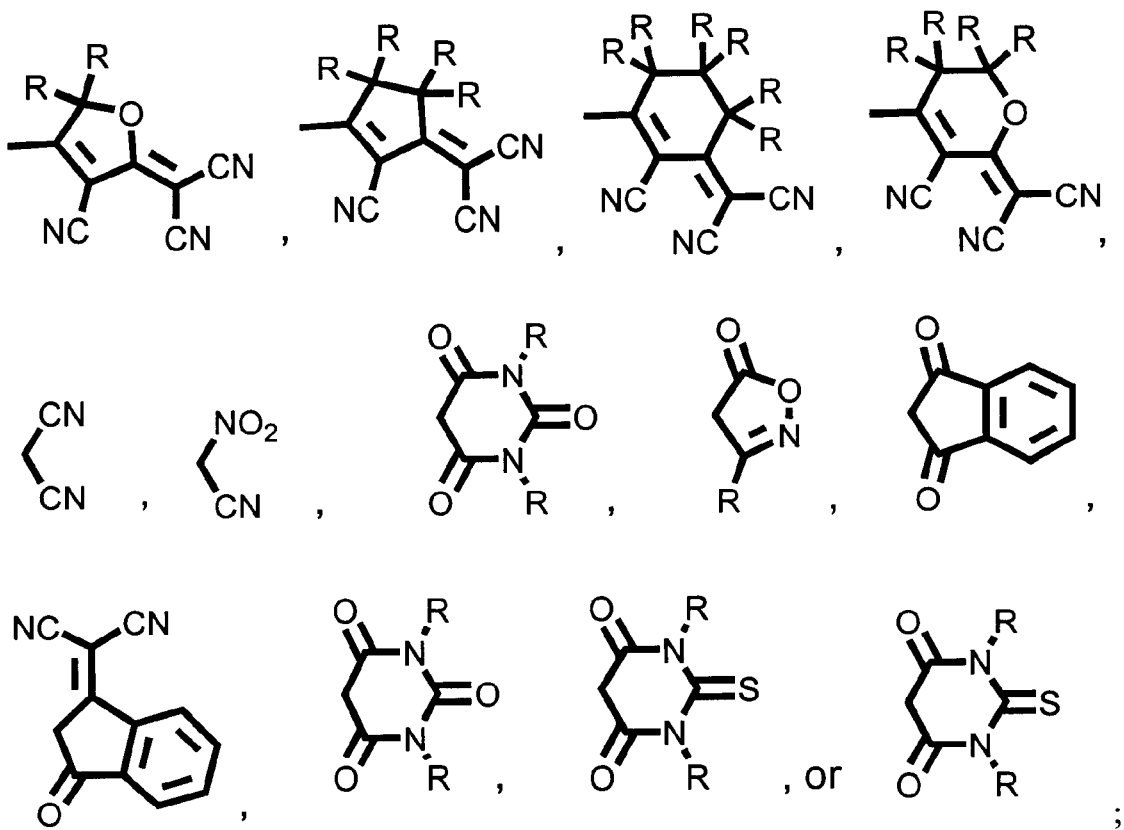
FIG. 1D illustrates exemplary electron acceptors for the chromophores of the present invention.

Referring to FIG. 1D, exemplary electron acceptors for the chromophores of the present invention are shown, wherein R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

The synthesis of CWC-1 is described in U.S. patent application Ser. No. 09/488,422 entitled "Sterically Stabilized Second-Order Nonlinear Optical Chromophores and Devices Incorporating the Same" filed on Jan. 20, 2000, now U.S. Pat. No. 6,361,717, which is incorporated herein by reference.

Figure 2:
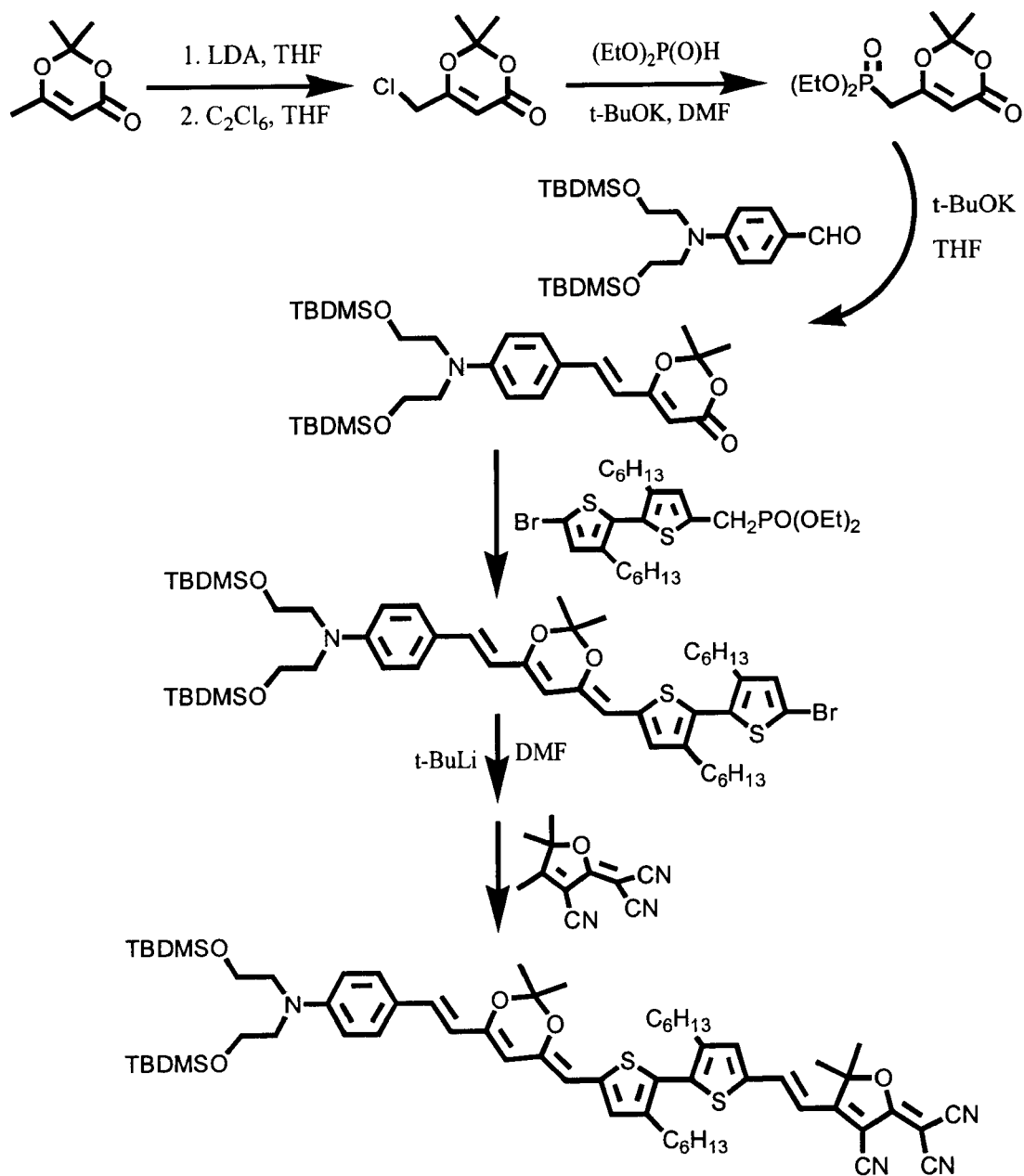
FIG. 2 illustrates an exemplary preferred synthetic scheme of a dioxin-derivatized chromophore (CWC-2) according to the present invention.

Referring to FIG. 2, the synthetic scheme of a dioxin-derivatized chromophore CWC-2 is illustrated. The detailed procedures are as follows:

6-Chloromethyl-2,2-dimethyl-1,3-dioxin-4-one. A solution of 2,2,6-trimethyl-1,3-dioxin-4-one (16.0 g, 0.11 mol) in THF (50 ml) was added dropwise over 20 min to a solution of lithium diisopropylamide (75 ml, 2.0 M solution in heptane/THF/ethylbenzene, 0.15 mol) at the temperature of −78° C. During the addition, a fine yellow suspension formed. Subsequently, the enolate solution was stirred at −78° C. for another 1 h and then cannulated to a solution of hexachloroethane (39 g, 0.16 mol) in THF (200 ml) at −50° C. over 30 min. The resulting reaction mixture was then allowed to warm slowly to −25° C., and poured into ice-cold aqueous 10% hydrochloric acid (200 ml). The organic layer extracted with ether was washed with brine, dried over sodium sulfate and concentrated under reduced pressure to afford 15.9 g of yellow oil. The product was used without further purification. $^1$H NMR (CDCl$_3$, ppm): δ 5.57 (s, 1H), 4.00 (s, 2H), 1.96 (s, 6H).

6-Diethylphosphonomethyl-2,2-dimethyl-1,3-dioxin-4-one. A mixture of 6-chloromethyl-2,2-dimethyl-1,3-dioxin-4-one (11 g, 0.062 mol) and potassium tert-butoxide (21 g, 0.187 mol) in dimethylformamide (200 ml) was stirred in the ice-bath. During the process, the resulting solution turned to purple after approximately 1 hour. After another 3 hours, the reaction mixture was treated cautiously with concentrated hydrochloric acid until the purple color disappeared. The resulting mixture was filtered, and the collected solids were washed with THF. The combined organic portions were purified by column chromatography to afford 12.6 g (73%) of 6-diethylphosphonomethyl-2,2-dimethyl-1,3-dioxin-4-one. $^1$H NMR (CDCl$_3$, ppm): δ 5.40 (d, 1H), 4.20 (m, 4H), 2.87 (d, 2H), 1.72 (s, 6H), 1.43 (t, 6H)

6-[E-(N,N-di(tert-butyldimethylsilyloxyethyl-amino)phenylene]-2,2-dimethyl-1,3-dioxin-4-one. It was prepared by the well known Hornor-Emmons reaction. The product was obtained as a yellow oil with a yield of 83%. $^1$H NMR (CDCl$_3$, ppm): δ 7.35 (d, 2H), 6.90 (d, 1H), 6.73 (d, 1H), 6.65 (d, 2H), 6.00 (s, 1H), 3.79 (t, 4H), 3.56 (t, 4H), 1.75(s, 6H), 0.91 (s, 18H), 0.03 (s, 12H).

5-{6-[E-(N,N-di(tert-butyldimethylsilyloxyethyl-amino)phenylene]-2,2-dimethyl-1,3-dioxin-4-vinyl}-5'-bromo-3,3'-dihexyl-2,2'-biothiophene. Yield: 15%. $^1$H-NMR (CDCl$_3$, ppm): δ 7.35 (d, 2H), 6.92 (d, 1H), 6.87 (s, 1H), 6.81 (s, 1H), 6.77 (d, 1H), 6.63 (d, 2H), 6.03 (s, 1H), 3.79 (t, 4H) 3.53 (t, 4H), 3.38 (q, 4H), 2.51 (t, 2H), 2.47 (t, 2H), 1.74(s, 6H), 1.56 (m, 4H), 1.24 (m, 12H), 1.17 (t, 6H), 0.94 (s, 18H), 0.87 (t, 6H), 0.03 (s, 12H).

5-{6-[E-(N,N-di(tert-butyldimethylsilyloxyethyl-amino)phenylene]-2,2-dimethyl-1,3-dioxin-4-vinyl}-5'-formyl-3,3'-dihexyl-2,2'-biothiophene. Following the procedure disclosed in the parent application for the preparation of 5-[E-4-(N,N-Diethylamino)phenylene]-5'-formyl-3,3'-dihexyl-2,2'-bithiophene a dark-red viscous oil was obtained in 81% yield. $^1$H-NMR (CDCl$_3$, ppm): δ 9.91 (s, 1H), 7.67 (s, 1H), 7.33 (d, 2H), 6.96 (d, 1H), 6.93 (s, 1H), 6.84 (s, 1H), 6.69 (d, 2H), 6.15 (s, 1H), 6.04 (s, 1H), 3.84 (t, 4H), 3.50 (t, 4H), 3.36 (q, 4H), 2.61 (t, 2H), 2.50 (t, 2H), 1.76(s, 6H), 1.58 (m, 4H), 1.24 (m, 12H), 1.21 (t, 6H), 0.91 (s, 18H), 0.87 (t, 6H), 0.01 (s, 12H).

2-Dicyanomethylen-3-cyano-4-{5-{6-[E-(N,N-di(tert-butyldimethylsilyloxyethyl-amino)phenylene1-2,2-dimethyl-1,3-dioxin-4-vinyl-3,3'-dihexyl-2,2'-bithien-5']-E-vinyl}-5,5'-dimethyl-2,5-dihydrofuran (Chromophore CWC-2). Prepared in a similar manner to TCF chromophores in the parent application. Yield: 49%. $^1$H-NMR (DMSO-d$_6$, ppm): δ 7.87 (d, 2H), 7.51 (s, 1H), 7.31 (d, 1H), 6.95 (d, 1H), 6.87 (s, 1H), 6.85 (d, 1H), 6.73 (d, 1H), 6.57(d, 2H), 6.17 (s, 1H), 6.10 (s, 1H), 3.87 (t, 4H), 3.54 (t, 4H), 3.39 (q, 4H), 2.64 (t, 2H), 2.51 (t, 2H), 1.78 (s, 6H), 1.76(s, 6H), 1.51 (m, 4H), 1.27 (m, 12H), 1.24 (t, 6H), 0.89 (s, 18H), 0.83 (t, 6H), 0.01 (s, 12H).

Referring to FIG. 3, electro-optic coefficients of corona-poled CWC-2-doped amorphous polycarbonate (APC) films are given together with their refractive indices. The polycarbonate, poly[bisphenol A Carbonate-co-4,4'-(3,3,5-trimethylcyclo hexylidene) diphenol carbonate], was purchased from Aldrich Chemical Company. CWC-2 and APC of different wt. ratio were mixed and dissolved in dichloroethane to make 10 wt/vol. % solutions. The solutions were spin cast onto indium-tin oxide coated glass substrates and dried in vacuum to give films of ~2.5 μm thickness. Films were then corona-poled at 150° C. for 30 minutes and their EO coefficients ($r_{33}$) were measured by attenuated total reflection method at 1.3 μm. The $r_{33}$ values obtained are among the highest ever reported.

Figure 4:
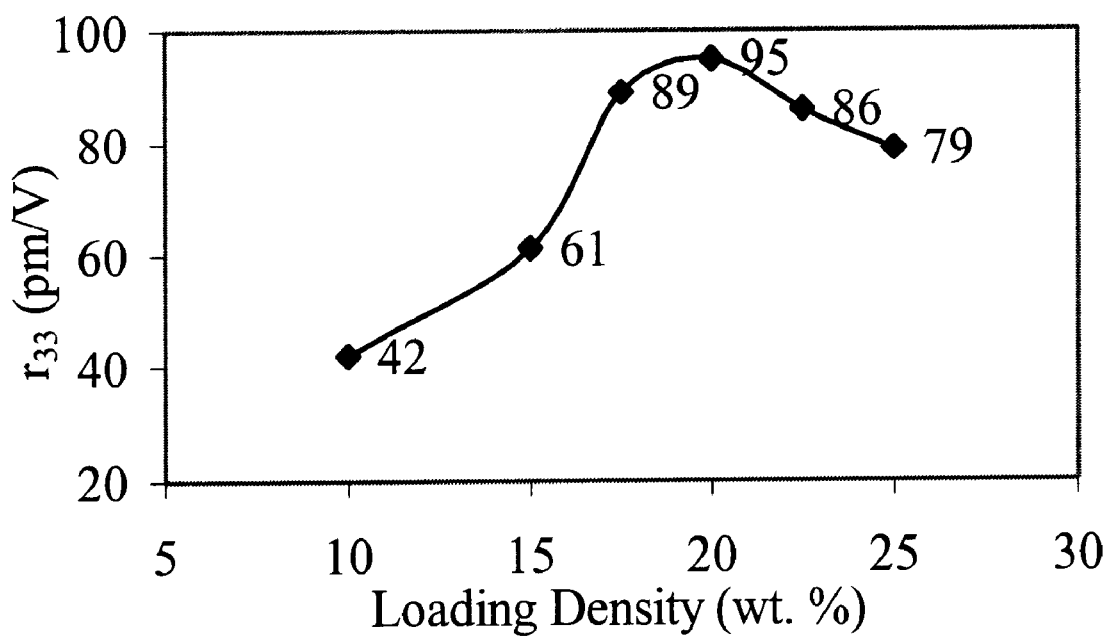
FIG. 4 is a plot of electro-optic coefficient of poled CWC-3/APC thin films as a function of chromophore loading density.

Referring to FIG. 4, the electro-optic coefficient of dioxine-derived chromophore, CWC-3, was investigated in polymethylmethacrylate (PMMA) composite thin films. Films of loading densities from 10 to 25% were studied. The results from electro-optic measurements show a remarkably large $r_{33}$ value of 95 pm/V (1064 nm) at a loading density of 20 wt %. Its $r_{33}$ value decreases at loading densities higher than 20 wt %. This $r_{33}$~loading density relationship is typical for chromophores of large dipole moments and large molecular nonlinearities.

The organic chromophores of the present invention exhibit exceptional molecular optical nonlinearity, thermal stability, and low optical absorption at communication wavelengths. The chromophore materials of the present invention are suitable for processing into hardened polymers for electro-optic devices. These materials can be employed not only in conventional electro-optic modulator device configurations but also in devices employing a constant bias field which permits the full potential of the materials to be demonstrated.

Figure 5A:
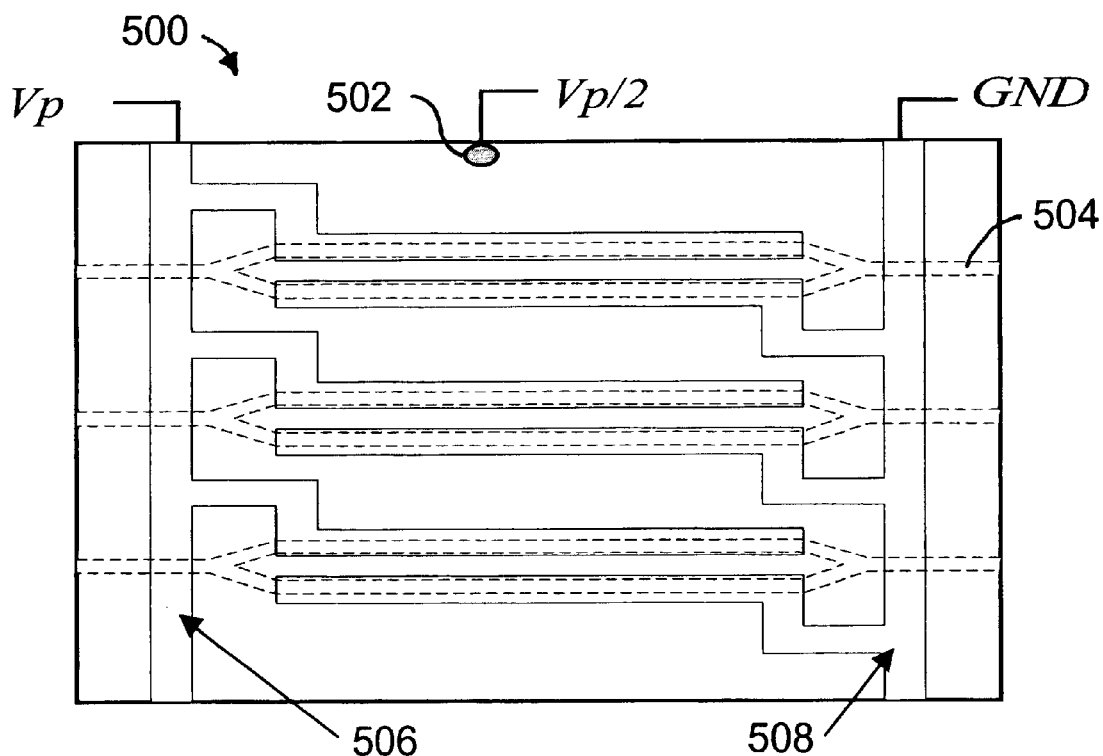
FIG. 5A is a top view of a poling structure for push-pull poling Mach-Zehnder modulators incorporating a chromophore material of the present invention.
Figure 5B:
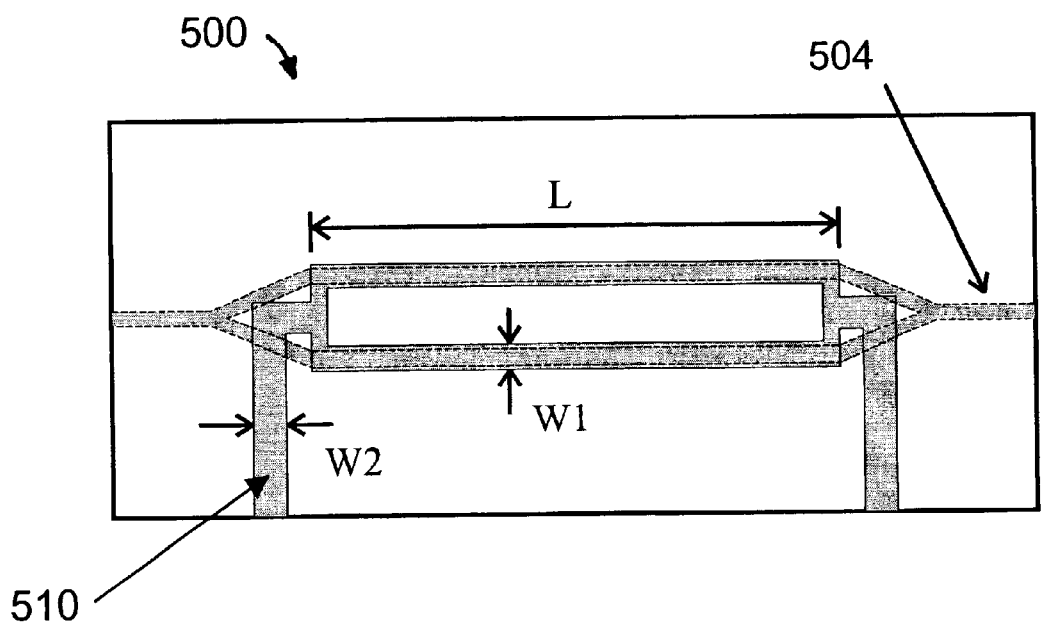
FIG. 5B is a top view of a three-layered Mach-Zehnder modulator incorporating a chromophore material of the present invention.

Referring to FIG. 5A, a poling structure is shown for push-pull poling Mach-Zehnder modulators 500 that incorporate a chromophore material of the present invention. A ground plane 502 and ridged optical waveguides 504 are formed as shown employing standard fabrication procedures to make the three-layered Mach-Zehnder modulators 500. By way of example, the total thickness of each device is 7.5 μm. Au metal is deposited on top of the upper cladding layer and patterned to make an electrode structure for the electrode poling. In the illustrated exemplary device, this electrode structure comprises a first poling electrode 506 and a second poling electrode 508 formed as shown. Preferably, the sample is enclosed in a box where nitrogen or argon is purged to keep the atmosphere oxygen-free to prevent an air breakdown between two closely spaced electrodes. The temperature of the sample is raised to about 145° C., which is close to the glass transition temperature of the electro-optic polymer material. Then, a high electric field of about 80~100 V/μm is applied across the polymer layers to pole the E/O polymer in order to enhance the electro-optic effect. The two arms of the Mach-Zehnder modulator are polled in opposite directions providing for reversed optical nonlinearities. After poling, the poling electrodes 506, 508 are etched away or otherwise removed. Referring to FIG. 5B, the upper seed layer for micro-strip electrodes is deposited and then electroplating is used to increase the electrode thickness to ~3 to 5 μm. The finished modulator 500 has just one "single-armed" driving electrode 510 formed as shown with, for example, L=20 mm, W1=8 μm, W2=28 μm. The optical end facets of the polymer chip are formed, for example, by dicing with a nickel blade. Then the wafer is diced again along alignment marks to separate individual devices. It has been observed that this modulator configuration has a chirp parameter close to zero, simplifies the RF driver design, and improves modulator DC bias stability. Moreover, the push-pull modulator 500 allows for a 100% reduction in the driving voltage.

Figure 6:
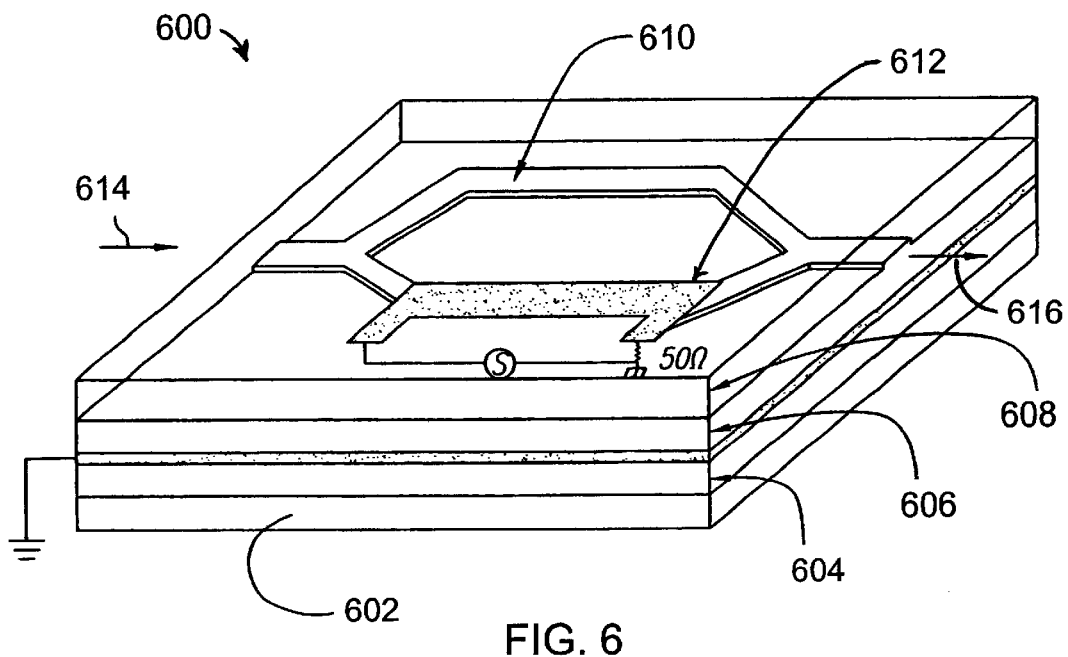
FIG. 6 illustrates an exemplary preferred Mach Zehnder modulator incorporating a chromophore material of the present invention.

Referring to FIG. 6, an exemplary preferred Mach Zehnder modulator 600 incorporating a chromophore material of the present invention is illustrated. The illustrated modulator 600 includes a Si substrate 602, an Epoxylite (3 μm) layer 604, a PU-chromophore (1.5 μm) layer 606, a NOA73 (3.5 μm) layer 608, a waveguide 610 and an electrode 612 configured as shown with light indicated by arrows 614, 616.

Figure 7:
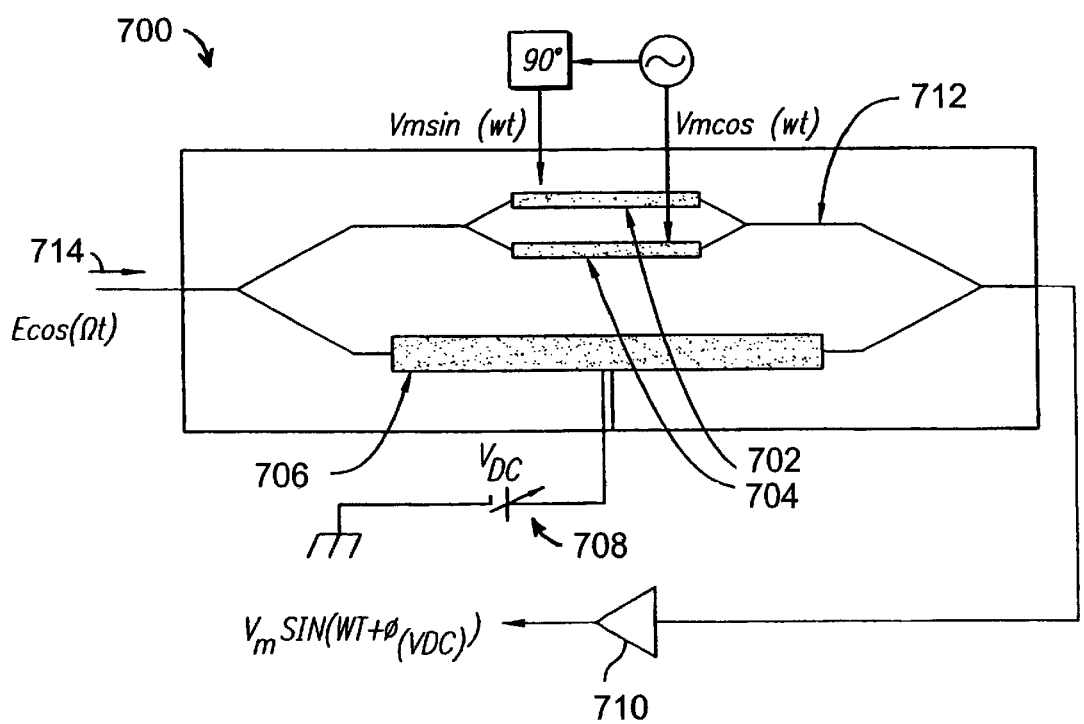
FIG. 7 illustrates the use of a chromophore material of the present invention (in the form of microstrip lines) in a microwave phase shifter of the type employed in optically controlled phased array radars.

Referring to FIG. 7, the materials of the present invention are shown in the form of microstrip lines in an exemplary preferred microwave phase shifter 700 of the type employed in optically controlled phase array radars. The illustrated microwave phase shifter 700 includes microstrip lines 702, 704, a DC control electrode 706, a DC source 708, a photodetector 710 and an optical waveguide 712 configured as shown with light indicated by arrow 714.

Figure 8:
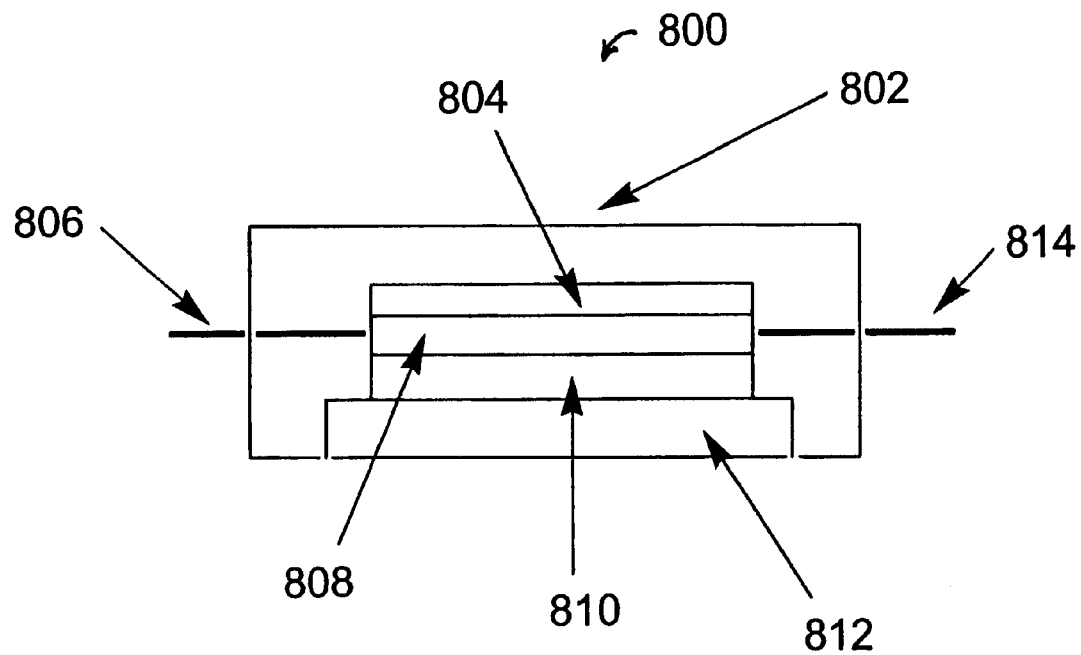
FIG. 8 illustrates an electro-optic device hermetically packaged within a container according to the present invention.

Referring to FIG. 8, an electro-optic device 800 is shown hermetically packaged within a container 802 according to the present invention. The electro-optic device 800 includes an upper cladding 804, an input fiber 806, a waveguide 808, a lower cladding 810, a substrate 812 and an output fiber 814 configured as shown with the container 802 positioned thereabout. For the sake of clarity, electrodes and other conventional structures are not shown. In an exemplary preferred embodiment, the electro-optic device 800 is hermetically packaged in a gas-tight container 802 (e.g., a metal casing) which is vacuumed or, alternatively, vacuumed and then filled with an inert gas including one or more of: nitrogen, helium, neon, argon, krypton and xenon. The principles of the present invention are applicable to any polymeric electro-optic device which operates in an (artificially created) oxygen-free environment.

Figure 9:
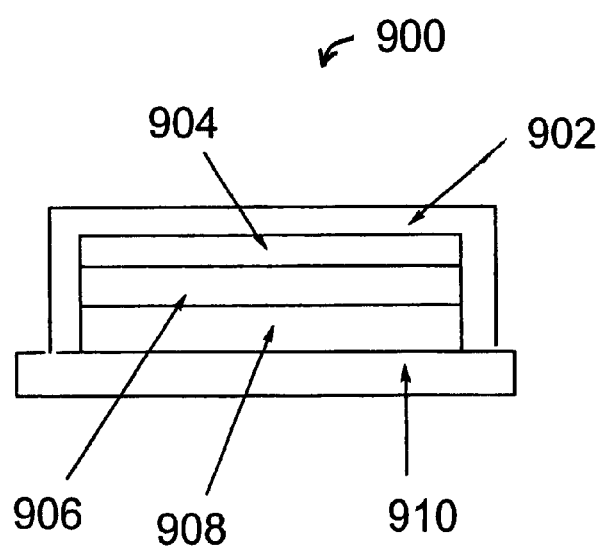
FIG. 9 illustrates an electro-optic device hermetically sealed with a protective coating according to the present invention.

Referring to FIG. 9, an electro-optic device 900 is shown hermetically sealed with a protective coating 902 according to the present invention. The electro-optic device 900 includes an upper cladding 904, a waveguide 906, a lower cladding 908 and a substrate 910 configured as shown with the protective coating 902 positioned thereabout. For the sake of clarity, electrodes and other conventional structures are not shown. The protective coating 902 comprises a material with a low oxygen permeativity which prevents oxygen from entering into the device environment. In an exemplary preferred embodiment, the electro-optic device is hermetically sealed with a UV curable polymer such as UV-15 or epoxy polymer. The principles of the present invention are applicable to sealing polymeric electro-optic devices with any coating material which has a sufficiently low oxygen premeditative to prevent oxygen from entering into the device environment.

Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

We claim:

1. A nonlinear optical device comprising:
an active element formed from a chromophore including
an electron donor group,
an electron acceptor group, and
a bridge structure between the electron donor group and the electron acceptor group;
wherein the electron donor group and the bridge structure are formed as:

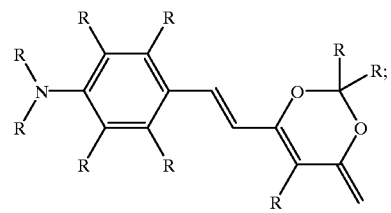

wherein R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

2. A nonlinear optical device comprising:
an active element formed from a chromophore including
an electron donor group,
an electron acceptor group, and
a bridge structure between the electron donor group and the electron acceptor group;
wherein the bridge structure is formed as:

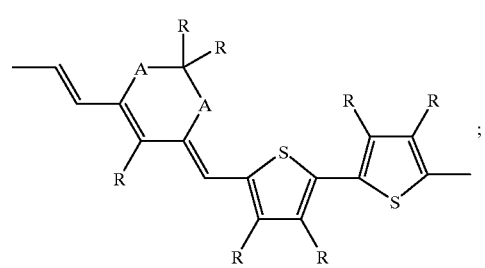

wherein A is selected from $CH_2$ and O;
wherein R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

3. The nonlinear optical device of claim 2, wherein the electron acceptor group is selected from:

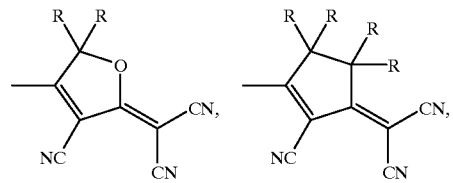

-continued

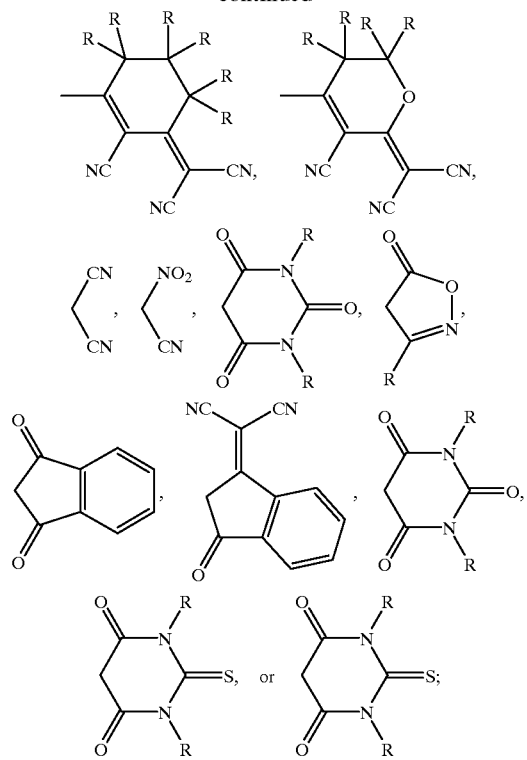

wherein R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

4. A nonlinear optical device comprising:
an active element formed from a chromophore formed as:

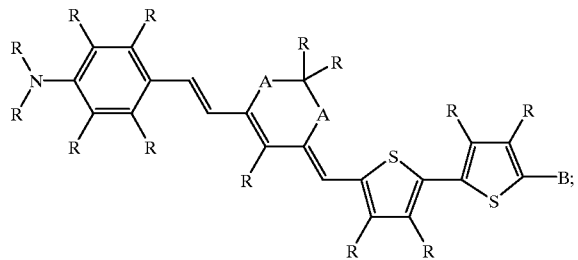

wherein A is selected from CH$_2$ and O;
wherein B is an electron acceptor;
wherein R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

5. The nonlinear optical device of claim 4,
wherein the electron acceptor B is selected from:

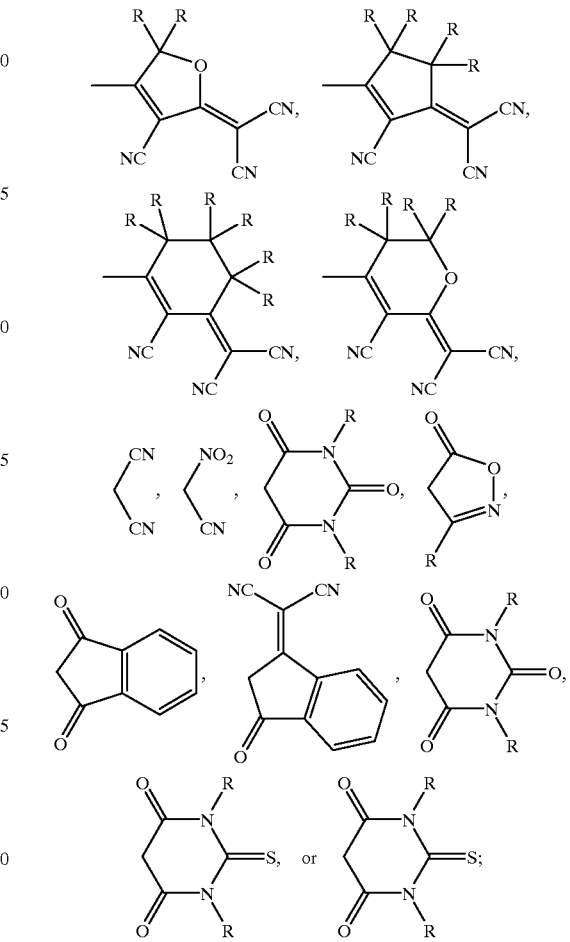

wherein R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

6. The nonlinear optical device of any of claims 1 to 5 wherein the device is an electro-optic modulator.

7. The nonlinear optical device of any of claims 1 to 5 wherein the device is a phase shifter.

* * * * *